United States Patent [19]
Ziegler et al.

[11] Patent Number: 5,133,059
[45] Date of Patent: Jul. 21, 1992

[54] COMPUTER WITH MULTIPLE PROCESSORS HAVING VARYING PRIORITIES FOR ACCESS TO A MULTI-ELEMENT MEMORY

[75] Inventors: Michael L. Ziegler, Whitinsville; Robert L. Fredieu, Arlington, both of Mass.; Heather D. Achilles, Hudson, N.H.

[73] Assignee: Alliant Computer Systems Corporation, Littleton, Mass.

[21] Appl. No.: 639,413

[22] Filed: Jan. 10, 1991

Related U.S. Application Data

[63] Continuation of Ser. No. 079,756, Jul. 30, 1987, abandoned.

[51] Int. Cl.$^5$ .................... G06F 9/46; G06F 12/06; G06F 15/16
[52] U.S. Cl. .................... 395/425; 364/228.1; 364/242.8; 364/246.3; 364/246.4; 364/254.4; 364/931.46; 364/957.1; 364/966.3; 364/DIG. 1; 395/800; 395/725
[58] Field of Search ... 364/200 MS File, 900 MS File; 395/425, 800, 725

[56] References Cited

U.S. PATENT DOCUMENTS

| | | | |
|---|---|---|---|
| 3,931,613 | 1/1976 | Gruner et al. | 340/172.5 |
| 4,009,470 | 2/1977 | Danilenko et al. | 364/200 |
| 4,048,623 | 9/1977 | Gruner | 364/900 |
| 4,232,294 | 11/1980 | Burke et al. | 340/147 |
| 4,293,910 | 10/1981 | Flusche et al. | 364/200 |
| 4,449,183 | 5/1984 | Flahive et al. | 364/200 |
| 4,550,367 | 10/1985 | Hattori et al. | 364/200 |
| 4,564,900 | 1/1986 | Smitt | 364/200 |
| 4,586,133 | 4/1986 | Steckler | 364/200 |
| 4,636,942 | 1/1987 | Chen et al. | 364/200 |
| 4,638,431 | 1/1987 | Nishimura | 364/200 |
| 4,661,900 | 4/1987 | Chen et al. | 364/200 |
| 4,663,756 | 5/1987 | Retterath | 370/85.6 |
| 4,722,046 | 1/1988 | Kasrazadeh et al. | 364/200 |
| 4,783,736 | 11/1988 | Ziegler et al. | 364/200 |
| 4,794,521 | 12/1988 | Ziegler et al. | 364/200 |
| 4,953,081 | 8/1990 | Feal et al. | 364/200 |

OTHER PUBLICATIONS

Weik, M., Standard Dictionary of Computers and Information Processing, 1969, pp. 167 and 168.
Ziegler, M. L., U.S. patent application Ser. No. 757,859, filed Jul. 22, 1985, "Digital Computer with Multisection Cache".
Driscoll, G. C. et al., "Split Cache with Variable Interleave Boundary", IBM Technical Disclosure Bulletin, vol. 22, No. 11, Apr. 1980, pp. 5183-5186.
Yamour, J., "Odd/Even Interleave Cache with Optimal Hardware Array Cost, Cycle Time and Variable Data Port Width", IBM Technical Disclosure Bulletin, vol. 23, No. 7B, Dec. 1980, pp. 3461-3463.
Smith, Alan J., "Cache Memories", ACM Computing Surveys, vol. 14, No. 3, Sep. 1982, pp. 473-530.
Hoogendoorn, "Reduction of Memory Interference in Multiprocessor Systems", IEEE Proceedings of the 4th Annual Symposium on Computer Architecture, Mar. 1977.
Kuck, David J., "Parallel Processor Architecture-A Survey", 1975 Sagamore Computer Conference on Parallel Processing, pp. 15-39.
Fielland et al., "32-bit Computer System Shares Load Equally Among up to 12 Processors", Electronic Design, Sep. 6, 1984, pp. 153-162, 164, 166, 168.
Yeh et al., "Shared Cache for Multiple-Stream Computer Systems", IEEE Transactions on Computers, vol. C-32, No. Jan. 1983, pp. 38-47.

Primary Examiner—Thomas C. Lee
Assistant Examiner—Ayni Mohamed
Attorney, Agent, or Firm—Fish & Richardson

[57] ABSTRACT

A parallel processing computer is disclosed in which a plurality of memory elements (e.g., caches) are accessable by a plurality of processors, and in which a fixed access priority for the processors is varied periodically to reduce differences in processing times between the processors in applications where memory access conflicts occur. The variation in priority is done infrequently enough so as not to disturb the ability of the system to avoid memory access conflicts by falling into a "lockstep" condition, in which the fixed priority combined with a selected interleaving of the memory elements produces a memory access pattern that, for certain memory strides, produces no memory access conflicts.

14 Claims, 3 Drawing Sheets

COMPUTER WITH MULTIPLE PROCESSORS HAVING VARYING PRIORITIES FOR ACCESS TO A MULTI-ELEMENT MEMORY

This is a continuation of copending application(s) Ser. No. 07/079,756 filed on Jul. 30, 1987, now abandoned.

BACKGROUND OF THE INVENTION

1. Field of the Invention

This invention relates to digital computers capable of parallel processing, and particularly to assigning memory access priorities to the processors in such computers.

2. Description of the Related Art

In engineering and scientific applications, it is typical to find repetitive accesses to memory at fixed address intervals known as strides. Each new access initiated by a processor is for a memory location separated from the last access by the length of the stride. A stride of one means that the processor accesses every word (whose length may vary) in sequence. A stride of two means that every other word is accessed. When interleaved memory elements (i.e., ones in which memory addresses are assigned on the basis of a low-order portion of the memory address) are accessed by the processors, the stride determines a unique sequence of memory accesses known as the access pattern.

Caches have long been used in digital computers, and have been applied to parallel processing, with one cache assigned to each processor. A cache is a high-speed memory containing copies of selected data from the main memory. Memory accesses from a processor come to the cache, which determines whether it currently has a copy of the accessed memory location. If not, a cache "miss" has occurred, and the cache customarily stops accepting new accesses while it performs a main memory access for the data needed by the processor.

Conventionally each cache serves a single processor, but a cache configured so that it may serve multiple processors is disclosed in copending U.S. patent application Ser. No. 757,859, hereby incorporated by reference.

Where several caches are serving multiple processors, it is desirable to minimize simultaneous accesses by different processors to the same cache. One mechanism for doing so is disclosed in the referenced application. Each processor is assigned a fixed priority level, and the caches are interleaved in such a manner that, for selected memory strides, the processors fall into an access pattern in which no simultaneous access requests occur (known as "lockstep").

SUMMARY OF THE INVENTION

We have come to realize that, while this interleaving mechanism produces efficient operation when lockstep can be achieved, it may lead to inefficiency in some situations where lockstep does not occur (e.g., because of frequent cache misses, or memory accesses that do not follow a stride pattern, or that follow an unusual stride that will not force lockstep to occur). In these situations, if the parallel processors are called upon to process tasks of comparable size (e.g., when a vector operation is evenly split among the processors) and the software allows the first-to-finish processor to remain idle until the last-to-finish processor has completed its task, the fixed priority can produce inefficient operation. A processor with a low priority will take a longer time to complete the task than a processor with a high priority, because of the greater number of instances when the low priority processor will wait for access to the cache. Higher priority processors will finish sooner than those with low priority and will remain idle waiting for the others to finish.

We have discovered a technique for improving performance in those situations where lockstep is not achieved, without substantially degrading performance when it is. The memory elements are interleaved and processors are assigned fixed priority levels, all as described in the cited copending application. But performance is improved in the absence of lockstep by periodically rotating the fixed priority levels among the processors, so that delays (e.g., from cache access conflicts and cache misses) are more equally shared by the processors. Preferably, the period between priority rotation is made long enough not to interfere with establishment of lockstep (for those cases where lockstep can be achieved), yet not so long as to unduly reduce the delay-sharing benefit of the priority rotation (in those cases when lockstep is not achieved and when early finishing processors must remain idle until other processors are finished). The invention is extremely simple to implement (e.g., using a counter to initiate the priority rotation after a fixed number of cache cycles) and achieves a significant improvement in processing speed in the non-lockstep situation, without appreciable loss of speed in the lockstep case.

In preferred embodiments, the priority rotation is such that the lowest priority pair of processors are moved to the highest priority position at each priority rotation and the other pairs of processors are moved down a notch in priority. In the case where there are eight processors, four cache quadrants, and the cache operates at twice the clock speed of the processors (so that the quadrants are capable of accepting two accesses during each processor cycle), priority rotation of processor pairs is preferrably done every 14 cache cycles.

Other features and advantages of the invention will be apparent from the following description of a preferred embodiment and from the claims.

DESCRIPTION OF THE PREFERRED EMBODIMENT

Figure 1:
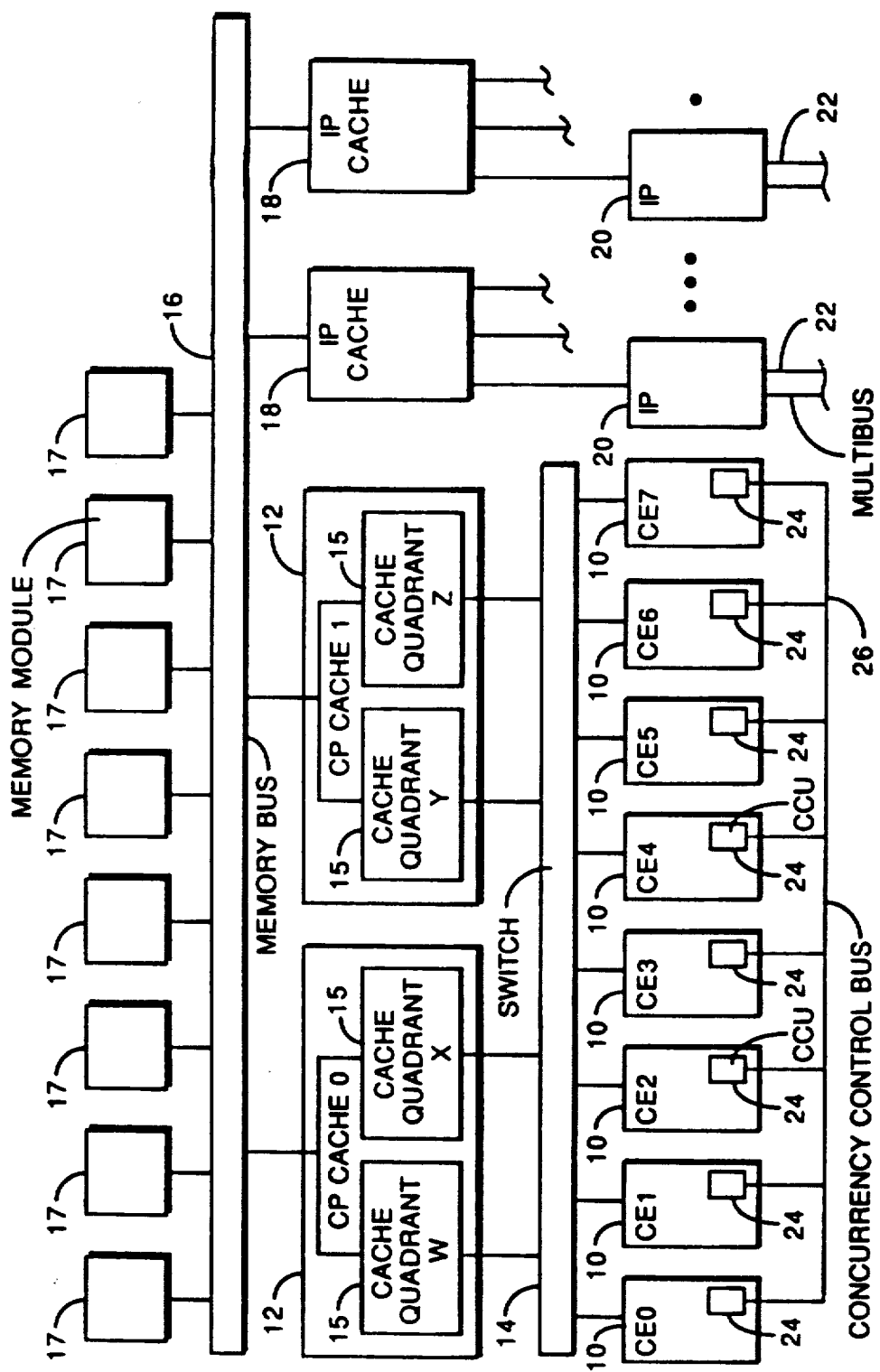
FIG. 1 is a system block diagram.

A system block diagram is shown in FIG. 1. Eight high-speed processors or computational elements (CEs) 10 are connected to two central processing cache boards 12 by a switch 14 which resides on a backplane (not shown) into which the CE and cache boards are plugged. Each cache board 12 comprises two cache quadrants 15. The switch permits any four CEs to be concurrently accessing the four cache quadrants. The CEs each have a concurrency control unit (CCU) 24 for controlling concurrent processing. The CCUs communicate with other CCUs across a concurrency control bus 26. Memory bus 16 connects the cache quadrants to eight memory modules 17 (each 8 or 32 megabytes). Also connected to the memory bus are two interactive processor caches 18, each of which is connected to three interactive processors (IPs) 20. Each IP serves a multibus 22, to which peripheral devices (not shown) are connected.

The system is a shared-global-memory, symmetric (i.e. not master-slave) multiprocessing computer particularly useful for general scientific and engineering computation. The CEs concurrently process different iterations of the same iterative construct (but they may also operate independently to provide a high-performance multi-tasking system). The IPs are moderate-speed interactive processors that are used for handling input/output traffic, text editing, and similar operations. Data types supported include 8, 16, and 32 bit integer/logical data as well as IEEE standard 32 and 64 bit floating-point data on the CEs only. Memory is virtually addressed. CEs access global memory through cache boards 12, which the CEs communicate with via switch 14. Each CE has its own 16K byte virtually-addressed instruction cache (not shown). The IPs access global memory through interactive processor caches 18.

The CEs are intended for high-speed computations. The CEs are identical, and as few as one may be installed in a system. Any number of CEs may participate in concurrent processing. Those that do are said to be in the concurrency complex (hereinafter "the complex"). Those that do not are said to be detached. CEs can be detached in the event that a job mix being executed on the system includes jobs that cannot make use of concurrent processing (e.g. compilation and debugging) as well as jobs that can (e.g. production jobs). A detached CE acts as if it were a system with only one CE present. CEs have a 170 nanosecond clock.

The system has a global central processing cache that serves up to eight CEs. The cache is divided into four interleaved quadrants 15 (denoted W, X, Y, Z), two of which reside on each of two CP cache boards 12; together, the four cache quadrants comprise a four-way interleaved processing cache. Cache quadrants have a 85 nanosecond clock, which is twice the frequency of the CE clock. Each cache quadrant can ordinarily complete one quadword (64-bit) read or write access in each 85 nanosecond cycle, resulting in a total peak throughput in the vicinity of 375 megabytes per second.

The block size of the cache (the smallest amount of data moved between the cache and memory) is 32 bytes. The data of each block is interleaved between two quadrants W,X on the same cache board so that for any 32-byte block quadwords 0 and 3 (quadwords are 8-byte words) are contained in quadrant W and quadwords 1 and 2 in quadrant X. Contiguous 32-byte blocks are interleaved between cache boards so that quadwords 4 and 7 are located in quadrant Y and quadwords 5 and 6 in quadrant Z.

The cache quadrants receive a 28-bit physical byte address from the CEs. Two bits (bits 3 and 4) of the address specify the desired quadword within the cache block. Because quadwords 0 and 3 are located in one quadrant and quadwords 1 and 2 are located in the other, a CE-supplied CADR4X3 signal (see below), which is the Exclusive OR of bits 3 and 4, is used to determine which cache quadrant on a CP cache board contains the desired data. The CE also supplies a normal address bit 4 so that the selected cache quadrant can determine which of its two words is required.

Bit 5 of the address (supplied as CADR5 by the requesting CE; see below) indicates which of the two CP cache boards in a four-way interleaved system contains the desired block of data.

Figure 2:
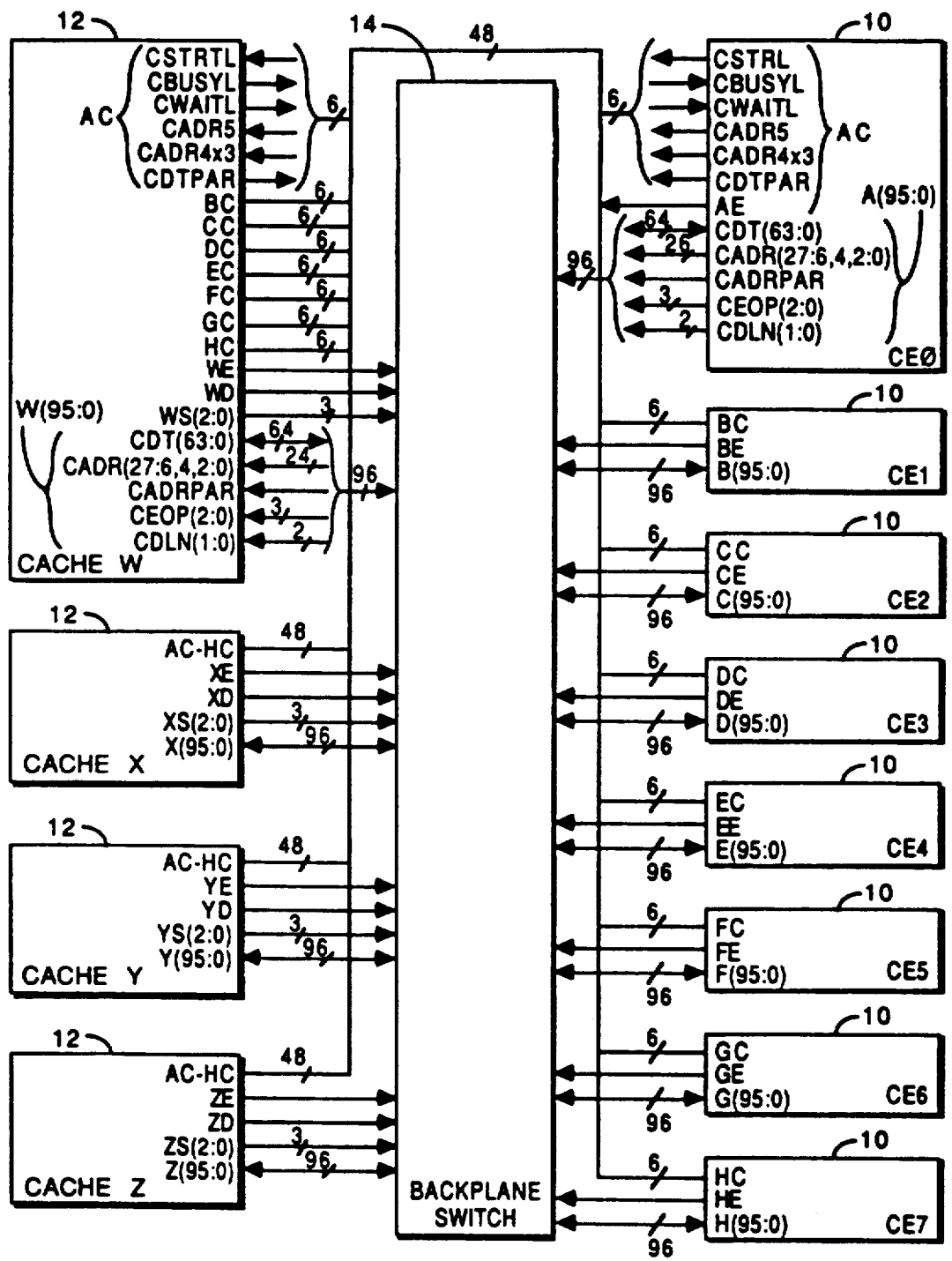
FIG. 2 is a block diagram showing the computational elements, a backplane switch, and cache quadrants, and the connections therebetween.

The CEs are connected to the cache quadrants by backplane switch 14, as shown in FIG. 2. Forty-eight control lines 200 extend across the backplane directly from the CEs to the cache quadrants, without passing through the backplane switch. Six control lines are connected to each CE, for a total of forty-eight control lines, all of which are are connected to each quadrant. The six control lines for each CE are: CSTRTL, CBUSYL, CWAITL, CADR5, CADR4X3, and CDTPAR. Collectively, the six control lines are denoted AC for CE0, BC for CE1, CC for CE2, and so on. CBUSYL, CWAITL, and CDTPAR are implemented as open-collector signals.

Ninety-six lines extend to the backplane switch from each CE and each cache quadrant: sixty-four bidirectional data lines CDT(63:0), twenty-six address lines CADR(27:6,4,2:0), an address parity line CADRPAR, three CE operation lines CEOP(2:0), and two data-length lines CDLN(1:0). Each CE and cache quadrant also provides the backplane switch with enable lines, e.g. AE and WE, for enabling data and addresses to be read from the ninety-six bidirectional lines connected to the switch. The cache quadrants provide the backplane switch with direction signals WD, XD, YD, ZD, which define the direction of data being transferred through the switch, and two sets of three-bit CE selection signals WS(2:0), XS(2:0), YS(2:0), ZS(2:0), which specify the CE to which, or from which, a transfer is being made. Only one set of selection signals is shown in the drawings, but separate 3-bit selection signals are provided for addresses and data.

Figure 3:
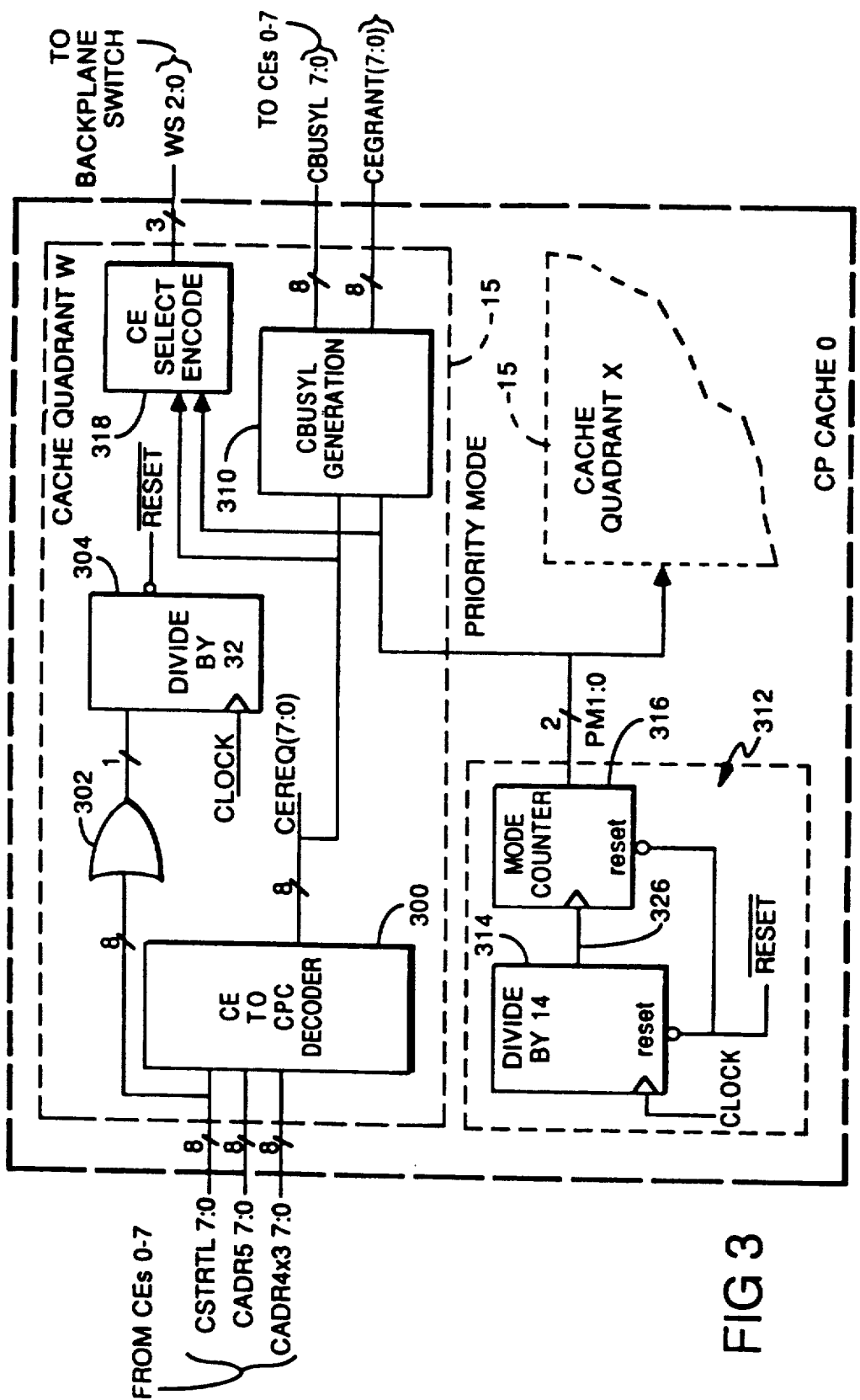
FIG. 3 is a block diagram showing a portion of the digital logic on the CP cache boards and cache quadrants of FIG. 1.

Referring to FIG. 3, control lines CSTRTL, CADR5, and CADR4X3 (one of each from each CE) enter cache board 12 and, within board 12, cache quadrant W where they serve as inputs to a CE-to-central-processing-cache (CPC) decoder 300. Decoder 300 outputs eight CE request lines CEREQ(7:0) which indicate which of the eight CEs are currently attempting to access quadrant W. For each CE requesting access, a corresponding CEREQ line is asserted. CEREQ(7:0) is one of the inputs into CBUSYL generation logic 310; the other input to CBUSYL generation logic 310 is the priority mode signal PM(1:0), which indicates which pair of CEs (e.g. pair CE0, CE1) currently has the highest priority level. PM(1:0) is generated by priority mode logic 312 on cache board 12. Priority mode logic 312 is shared by the two cache quadrants 15 on each cache board 12, and is replicated on each cache board. Logic 312 includes a divide-by-14 counter 314 which supplies, once every fourteen clock cycles, a pulse for clocking a mode counter 316. Counter 316 generates PM(1:0), cycling continuously through the sequence "00", "01", "10", "11". Using CEREQ(7:0) and PM(1:0), CBUSYL Generation logic 310 generates CBUSYL (7:0), which goes to the CEs, and CEGRANT (7:0), which connects to another section of the internal logic of the cache quadrant. CEREQ(7:0) and PM(1:0) are also inputs to CE Select Encoder 318, which generates three bit selection signal WS(2:0). Signals CSTRTL(7:0) are also inputs to an eight-input OR gate 302 whose output is the reset input to divide-by-32 counter 304. Divide-by-32 counter 304 is connected to the RESET inputs of divide-by-14 counter 314 and mode counter 316. Decoder 300, logic 310, logic 318, OR gate 302, counter 304, and accompanying signal lines are replicated in each of the cache quadrants 15.

In operation, a CE initiates a cache operation by asserting its CSTRTL line and supplying the two address bits CADR5 and CADR4X3 specifying which of the four interleaved quadrants of the cache are involved in the operation. CADR5 is the fifth bit of the memory address involved in the operation being initiated by the CE. CADR4X3 is the exclusive-OR combination of bits three and four of the memory address. The reason that these two bits are combined in addressing the cache quadrants has to do with the way in which the cache quadrants are interleaved (see discussion below). If only two cache quadrants are in use (e.g. if only four CEs are in use), only address bit CADR4X3 is used to address a particular quadrant, and CADR5 is saved by the addressed cache quadrant for use with the remainder of the address transferred through the backplane switch.

As many as eight CEs may simultaneously bid for access to any of the four cache quadrants. Access conflicts are resolved by the cache quadrants. In the same 85 nanosecond cycle as the CSTRTL is asserted (the first cache cycle), the cache quadrant addressed resolves which of the contending CEs has priority. Referring to FIG. 3, for each CE that bids for access to a cache quadrant, one of the eight CSTRTL lines entering cache quadrant W will be asserted. For each CSTRTL line which is asserted, if the corresponding CADR5 and CADR4X3 lines indicate that it is cache quadrant W which the CE wishes to access, the corresponding CEREQ line will be asserted by decoder 300. As few as zero and as many as eight of the CEREQ lines may thus be asserted. The eight CEREQ lines indicate which of the CEs wish to access quadrant W.

When more than one CE is contending for access to the same quadrant, priority is given to the CE pair specified by the priority signal PM(1:0). (See below for discussion of why priority changes are made in pairs.) The priority mode signal PM(1:0) indicates which of the four pairs of CEs ("00" signifying CE0, CE1; "11", CE2, CE3; "10", CE4, CE5; "01", CE6, CE7) currently has the highest priority level. Within each pair of CEs, the CE having the lowest numerical designation prevails (thus CE0 prevails over CE1).

The priority mode signal is initialized on startup and incremented every 14 cache cycles. At startup, prior to the assertion of one of the CSTRTL lines, divide-by-14 counter 314 and mode counter 316 are reset so that PM(1:0) is set to "00", which designates the pair CE0, CE1 as the highest priority pair, the pair CE2, CE3 as the next highest, and so on. Every fourteen cache clock cycles, divide-by-14 counter 314 supplies a pulse on line 326 to mode counter 316, causing it to increment PM(1:0) by one (e.g. from 00 to 01). So long as counter 316 is not reset, it will continuously cycle PM(1:0) through the four priority modes (i.e. 00, 01, 10, 11), changing the mode once every fourteen cache clock cycles.

The assertion of a CSTRTL line by one of the CEs also resets, via OR gate 302, divide-by-32 counter 304. After being reset, if counter 304 reaches a count of thirty-two, indicating that no new requests for access have been received by cache quadrant W in 32 cache cycles, the counter asserts a RESET signal on line 317, causing counters 314 and 316 to be reset. (This assures that the system is always in the same priority state at startup, making it possible to reliably repeat an execution sequence which caused an abnormal cessation of system activity.)

In the second cache cycle, CE Select Encoder 318 uses the PM and CEREQ signals to select the CE whose access request is to be granted, and asserts the appropriate WS select lines going to backplane switch 14. Similarly, CBUSYL Generation Logic 310 asserts the CEGRANT line of the successful CE (signalling the cache quadrant to accept an address from that CE) and the CBUSYL lines of the losing CEs. CEs receiving CBUSYL continue to assert CSTRTL in subsequent cycles (if they continue to desire access to that quadrant). The cache quadrant continues to assert CBUSYL in subsequent cycles until it is able to accept an address from the CE in question or until the CE removes CSTRTL. When CBUSYL is removed, the address transfer takes place in the same cycle. A CE must remove its CSTRTL in the cycle following transfer of an address, or the cache quadrant will interpret its presence as a new cache access request. A cache access may be aborted by a CE by removing the CSTRTL assertion in the second cycle—the cycle in which the address transfer is to take place.

The preferred interleaving is shown in Table 1:

TABLE 1

| ADR(5:3) | ADR4X3 | Cache Quadrant | Cache Board |
|---|---|---|---|
| 0 0 0 | 0 | W | 0 |
| 0 0 1 | 1 | X | 0 |
| 0 1 0 | 1 | X | 0 |
| 0 1 1 | 0 | W | 0 |
| 1 0 0 | 0 | Y | 1 |
| 1 0 1 | 1 | Z | 1 |
| 1 1 0 | 1 | Z | 1 |
| 1 1 1 | 0 | Y | 1 |

The interleaving scheme provides excellent cache accessing efficiency (i.e. a minimum of wasted cache access cycles due to more than one CE attempting to access the same cache) when a plurality of CEs are concurrently processing a program that accesses memory in strides of one and two quadwords (as well as larger strides that are divisible by two but not by four; e.g. strides of six and ten quadwords). A memory stride is the address spacing between successive memory accesses by software operating on the system. Scientific and engineering software, for which the present system is best suited, typically accesses memory with strides of both one and two (a stride of ten is also relatively common).

What is advantageous about the interleaving scheme of Table 1 is that it produces a stride-of-one access pattern (WXXWYZZY) that forces the CEs into a phase relationship (termed "lockstep") in which there are a minimum of (and ideally no) wasted cache accesses. Lockstep is also achieved in a similar way for strides of two (and larger strides divisible by two but not by four). Table 2 shows the initial cache

TABLE 2

| CE | | | | | | | | | | | | | | | | |
|---|---|---|---|---|---|---|---|---|---|---|---|---|---|---|---|---|
| 1 | W | X | X | W | Y | Z | Z | Y | W | X | X | W | Y | Z | Z | Y |
| 2 | # | W | # | X | X | W | Y | Z | Z | Y | W | X | X | W | Y | Z |
| 3 | # | # | W | # | # | X | X | W | Y | Z | Z | Y | W | X | X | W |

TABLE 2-continued

| CE | | | | | | | | | | | | | | | | |
|---|---|---|---|---|---|---|---|---|---|---|---|---|---|---|---|---|
| 4 | # | # | # | # | W | # | # | X | X | W | Y | Z | Z | Y | W | X | accesses in the four CEs for a stride of one. In the hypothetical shown, the four CEs initially attempt to access the same cache quadrant in the first cycle (something approximating what could occur at initiation of vector concurrent processing). Access conflicts force CE2, CE3, and CE4 (which, at startup, have lower priority levels than CE1) to to be locked out of some accesses (indicated by a #) until each reaches a phase relationship in which no further conflicts arise, wherein each CE's access pattern is offset by an even number of cycles from that of the CE with the next highest priority. This phase relationship will be reached by all the CEs no matter what their initial phase relationship.

The cache accessing sequence shown in Table 2 actually shows only half of the accesses that occur during a typical initiation of vector-concurrent processing on an eight-CE system (with all eight CEs participating in the concurrency complex). The sequence of Table 2 depicts the accessing occurring every other 85 nanosecond cache cycle for four of the eight CEs; the same accessing pattern occurs during the other cycles for the other four CEs. Assuming for simplicity that all eight CEs initially contend for the same cache quadrant, those that lose on the first cycle will contend on the very next cache cycle (not shown in the Table 2 sequence). One CE will win during that cycle, and the remaining ones will contend during the third cache cycle (the second cycle shown in Table 2). One by one the eight CEs will find a niche on one or the other of the alternating cache cycles, with the result that four will access the cache on odd cache cycles, and another four on even cycles (with the resulting assignment to odd or even cycles being random). The superior performance of the preferred interleaving is most pronounced when seven to eight CEs are part of the concurrency complex.

This superior performance assumes, of course, that lockstep is achieved. This is not always the case. Frequent cache misses and cache access conflicts (as the result of software that does not access memory at the expected strides) will prevent lockstep from occurring. When this happens, the lowest priority processors (CE6, CE7 in the absence of any priority rotation) have the greatest difficulty accessing the cache quadrants, and thus take longer to complete tasks. The resulting difference in processing time can result in substantial inefficiency when the processors have been assigned comparable tasks and each is required to wait until all the others have completed their tasks before proceeding with a new task. In the absence of priority rotation, the highest priority processors (CE0, CE1) would finish their tasks much earlier than the lowest priority ones (CE6, CE7) and would unproductively remain idle until the lowest priority processors are finished. Examples of such situations are: (1) vector concurrent operations (i.e., operations in which the elements of a vector are divided evenly between the eight CEs for concurrent processing) where lockstep does not occur; (2) scalar concurrent operations where the number of iterations equals the number of CEs in the concurrency complex; (3) situations where all eight CEs are assigned different (but equal size) jobs and the operating softward waits for all to be completed before proceeding.

An illustration of how cache misses can result in greater processing delays for lower priority processors is given in Table 3. The lockstep phase relationship is disturbed when there is a cache miss because each such miss has a ripple down effect, such that delays are introduced in the access patterns of all CEs having a lower priority level until the patterns are forced back into lockstep. An example of a single cache miss and the resulting pattern of delays is illustrated (for the simplified use of processors) in Table 3 (a "*" indicates a cache miss):

TABLE 3

| CE | | | | | | | |
|---|---|---|---|---|---|---|---|
| 1 | W | * | X | X | W | Y | Z |
| 2 | Z | Y | W | # | X | X | W |
| 3 | Y | Z | Z | Y | # | W | X |
| 4 | X | W | Y | Z | Z | # | Y |

The illustrated miss causes a single clock cycle delay for each of the CEs having a lower priority level. The lower priority CEs experience cumulative delays from misses occurring in higher priority CEs. Thus, for example, the pair of CEs having the lowest priority level (CE6, CE7) accumulates delays whenever a cache miss was experienced by any other CE, whereas the pair of CEs having the highest priority level (CE0, CE1) experiences only those delays associated with their own misses.

The rotation of priority levels achieved by the invention is intended to prevent the burden of the delays caused by cache misses and cache access conflicts from being disproportionately borne by the eight CEs. An uneven distribution of the burden will cause an undesirable lopsidedness in the time required for the eight CEs to finish jobs of equivalent length. This condition, in which the CEs having lower priority levels accumulate proportionately more delays, is termed the "tail effect". Where cache misses or cache access conflicts are occurring frequently the tail effect becomes significant (e.g., the same task might take 165 clock cycles on CE0 but 231 cycles on CE7).

Rotation of the priority levels causes delays to be distributed more evenly among the CEs and thus there is a significant reduction in the tail effect (e.g. in the example just given, the difference in processing time is reduced from sixty-six to thirty-seven clock cycles). While the CE having the lowest priority level will still accumulate the most delays, any given CE retains the lowest priority level for only fourteen cycles, after which it acquires the highest priority level.

Competing considerations govern selection of the length of the period between priority rotations. The period should be long enough so as not to impact substantially on achievement of lockstep in applications where lockstep is possible (if a priority rotation occurs in the transition period before lockstep has been fully achieved, there will likely be delay in reaching lockstep), but short enough to reduce the tail effect in applications where lockstep cannot be achieved (too long a period will provide little or no averaging of delay between processors for tasks comparable in length to the period length). The lockstep phase relationship is not disturbed by the rotation of the priority levels after lockstep has been initially achieved, because priority levels only have an effect when more than one CE seeks access to the same cache quadrant.

For the disclosed embodiment, in which there are eight CEs and four cache quadrants (clocked at twice the frequency of the CEs, and thus capable of handling two accesses in one processor cycle), a fourteen cache cycle period between priority rotation is optimal.

The priority rotation is done in pairs (i.e., the highest priority pair of processors become the lowest priority pair, and so on) because adjacent processors (e.g., CE0 and CE1) do not significantly compete with one another for cache access, and thus effectively have the same priority. This happens because the caches, which operate at twice the speed of the processors, are able to service two processors "simultaneously", i.e., permit two processors to access the cache in one processor cycle. Thus, for example, if both CE0 and CE1 were simultaneously to access the same cache quadrant, the fact that CE1 has lower priority than CE0 would not ordinarily prevent CE1 from achieving access.

Other embodiments are within the following claims.

We claim:

1. A digital processing system, comprising:
a plurality of memory elements,
a plurality of parallel processors, said processors each having means for initiating an access of data from said memory elements simultaneously with accesses of other processors,
said memory elements being interleaved (i.e., each is assigned memory addresses on the basis of a low order portion of the memory address) so that the access patterns generated by said processors when accessing data from said memory elements at a predetermined stride permits said processors to reach a phase relationship (known as "lockstep") with other said processors in which each said processor is able to access a different said memory element simultaneously without creating access conflicts,
means for deciding, based on fixed priority levels, which said processor is granted access to a given memory element when there are simultaneous access requests to the given memory element, and
priority-altering means for altering at a predetermined periodic interval said fixed priority levels to vary the highest priority among said processors, said predetermined periodic interval being selected so as to allow enough time for said processors to fall into lockstep and said predetermined periodic interval being selected so as to reduce differences in the times required by each of said processors to complete comparable tasks not amenable to lockstep execution.

2. The digital processing system of claim 1 wherein said priority-altering means comprises means for varying priority by rotation of processors (or sets of processors) between priority levels.

3. The digital processing system of claim 2 wherein said priority-altering means comprises means for causing the processor (or set of processors) with the lowest priority to shift immediately to the highest priority, and for the other processors (or sets of processors) to shift to the next lowest priority level, each time said priority levels are altered.

4. The digital processing system of claim 1 wherein said priority-altering means comprises means for varying priority in sets of processors where the number of processors within a set equals the number of processors that can successfully access a said memory element in one processor cycle.

5. The digital processing system of claim 2, or 3 wherein said memory elements operate at N times the speed of said processors (i.e., N memory cycles equal one processor cycle), and wherein said processors are divided into sets each consisting of N processors, within which the priority level is the same.

6. The digital processing system of claim 5 wherein N is equal to two and said priority-altering means includes means for altering said priority after completion of 14 memory cycles.

7. The digital processing system of claim 6 wherein there are eight said processors and four said memory elements.

8. The digital processing system of claim 1, or 4 wherein said priority-altering means includes means for programmably adjusting the period between priority alterations.

9. The digital processing system of claim 1, or 4 wherein said memory elements are caches.

10. The digital processing system of claim 1, or 3 wherein said memory elements are so interleaved that the access pattern generated by said processors for a given power-of-two stride greater than one meets the condition that the pattern tolerates being offset with respect to an identical pattern by an OFFSET or any multiple of said OFFSET, said OFFSET being equal to the length of the access pattern divided by the number of memory elements (wherein tolerating means that no access conflicts arise).

11. The digital processing system of claim 10 wherein said memory elements are so interleaved that the access patterns generated by said processors for said given stride meet the further condition that the patterns include at least one conflict at every offset other than said OFFSET and multiples of said OFFSET, and said conflicts force said processors to assume a phase relationship with each other wherein the offset between access patterns equals said OFFSET or a multiple thereof.

12. The digital processing system of claim 11 wherein there are four said memory elements W,X,Y,Z and said memory elements are interleaved so that at a stride of one the access pattern is WXXWYZZY and at a stride of two the pattern is WXYZ.

13. The digital processing system of claim 11 wherein there are four memory elements W,X,Y,Z and said memory elements are interleaved as follows:

| Address Bits on Which Memory Elements Are Interleaved | Memory Element |
| --- | --- |
| 0 0 0 | W |
| 0 0 1 | X |
| 0 1 0 | X |
| 0 1 1 | W |
| 1 0 0 | Y |
| 1 0 1 | Z |
| 1 1 0 | Z |
| 1 1 1 | Y |

14. The digital processing system of claim 1 further comprising means for resetting the priority levels to an initial ranking after a preselected period of time has elapsed without an access request to any memory element.

* * * * *